United States Patent [19]

Douglas

[11] Patent Number: 5,097,469
[45] Date of Patent: Mar. 17, 1992

[54] PASSIVE MONITOR FOR BROADCAST COMMUNICATION NETWORK

[75] Inventor: Robert H. Douglas, Phoenix, Ariz.

[73] Assignee: Concord Communications, Inc., Marlboro, Mass.

[21] Appl. No.: 616,735

[22] Filed: Nov. 21, 1990

Related U.S. Application Data

[63] Continuation of Ser. No. 354,343, May 19, 1989, abandoned.

[51] Int. Cl.$^5$ ............... G06F 11/00; H04J 3/00
[52] U.S. Cl. .................... 371/20.1; 370/85.5; 371/25.1
[58] Field of Search ............ 340/825.05, 825.5; 370/85.4, 85.5, 94.1; 371/20.1, 20.6, 25.1, 60

[56] References Cited

U.S. PATENT DOCUMENTS

| 4,725,834 | 2/1988 | Chang et al. | 340/825.5 |
|---|---|---|---|
| 4,745,598 | 5/1988 | Ulug | 370/85.5 |
| 4,775,973 | 10/1988 | Tomberlin et al. | 370/94.1 |
| 4,785,448 | 11/1988 | Reichert et al. | 370/76 |
| 4,792,753 | 12/1988 | Iwai | 370/94.1 |
| 4,817,080 | 3/1989 | Soha | 370/17 |

FOREIGN PATENT DOCUMENTS

WO8806822 9/1988 PCT Int'l Appl. .

OTHER PUBLICATIONS

Feldmeier, D. C., "Statistical monitors for Local Area Networks", *11th Conference on Local Computer Networks*, Oct. 6-8, 1986, pp. 142-146.

Saydam, T. & Sethi, A. S., "Token Bus/Ring Local Area Network Management Concepts and Architecture", Mar. 31-Apr. 2, 1987, pp. 988-993, *Sixth Annual Conference Global Networks-Concept to Realization*.

Dahbura, A. T., et al., "Formal Methods for Generating Protocol Conformance Test Sequences", *Proceedings of the IEEE*, vol. 78, No. 8, Aug. 1990, pp. 1317-1326.

Malek, M., Choi, Y., "Real-Time Diagnosis of Homogeneous Systems", *IEEE*, 1985, pp. 155-159.

Wu, C., et al., "Knowledge-Based Network Operations", *Applications of Artificial Intelligence VI*, 1988, vol. 937, pp. 44-55.

Vassidiades, S., et al., "A Monitor Tool for a Network Based on the Cambridge Ring", *Practice and Experience*, vol. 16(7), pp. 671-687, Jul. 1986.

Kaplan, F., Omanson, R. C., "Application of Expert Systems to Transmission Maintenance", *IEEE*, 8/86, pp. 449-453.

Murphy, T., "Local Area Network Uses Token Ring", *New Electronics*, Dec. 11, 1841, pp. 71-74.

Hart, L., "For Network Managers", Finding Faults is No Easy Task, Data Communications, Sep. 84, pp. 189-192.

Petrauschke, H. F., "Set Up and Maintain Datacom Nets with A Data Line Monitor", *Telecommunications*, pp. 58, 60, 62.

(List continued a next page.)

*Primary Examiner*—Charles E. Atkinson
*Attorney, Agent, or Firm*—Cesari & McKenna

[57] ABSTRACT

The invention is a network monitor that passively detects sequences of control frame transmissions. Detected control frame sequences are compared to a model of the expected exchange of control frames. The monitor concludes that a malfunction has occurred when the detected control frame sequences do not match the frame sequences indicated by model. The monitor is quite useful with a network that uses a token passing protocol, since it can determine whether a particular station is working improperly by tracking whether the token is passed in the order proscribed by the expected token-passing sequence in the model. The monitor can detect and diagnose many types of network malfunctions. The monitor also observes and maintains statistics on network data traffic and configuration information, in real time. Since the monitor independently tracks which station has the token, statistics are developed on how much traffic is passing to and from bridges.

20 Claims, 8 Drawing Sheets

OTHER PUBLICATIONS

"Standards for Local Area Networks": Token-Passing Bus Access Method and Physical Layer Specifications, *IEEE 802.4 Draft K,* May, 1988, pp. 36–44.

Sticker, H., "Network Monitoring and Analysis (NMA)-An Advanced Network Monitoring Tool", *IEEE,* 9/86, pp. 1290–1294.

Campbell-Kelly, M., "Data Communications at the National Physical Laboratory" (1965–1975), *Annals of the History of Computing,* vol. 9, No. 3/4, 1988, pp. 221–247.

Press, L., "Benchmarks for LAN Performance Evaluation" *Communications of the ACM,* Aug. 1988, vol. 31, No. 8: pp. 1014–1017.

Burmeister, M., et al., "Monitoring Aids in an Experimental Broadband Communication System", *Reliability in Electrical and Electronic Components and Systems,* 1982, pp. 348–352.

Baily, C. C., et al., "An Operations System for Centralized Digital Transmission Network Maintenance", *Links for the Future,* 9/84, pp. 476–480.

Feridun, M., et al., "ANM: Automated Network Management System": *IEEE Network,* vol. 2, No. 2, 3/88, pp. 13–19.

"On the Road to Local Area Network Management", *Hewlett Packard,* 6/87.

Sudama, R., Chiu, D., "The Design of a Realtime DECnet Performance Monitor", Jul. 15, 1988, pp. 1–23.

Sudama, R., Chiu, D., "A Case Study of DECnet Application and Protocol Performance", *AGM Sigmetrics Conference,* May 24–27, 1988, Sep. 30, 1987, pp. 1–24.

Sudama, R., Chiu, D., "Studying the User and Application Behaviour of a Large Network", *A Workshop on Future Trend of Distributed Computing Systems in the '90s,* 9/14–16, 1988 pp. 1–23.

"Token-Passing Bus Access Method and Physical Layer Specifications", May, 1988, pp. 36–44.

HP 4972A Local Area Network (LAN) Protocol Analyzer Brochure Jun. 1987.

PASSIVE MONITOR FOR BROADCAST COMMUNICATION NETWORK

This application is a continuation of application Ser. No. 07/354,343, filed May 19, 1989, now abandoned.

FIELD OF THE INVENTION

This invention relates generally to electronic communications and more specifically to a passive malfunction and performance monitor for a broadcast communication network.

BACKGROUND OF THE INVENTION

Data communication networks allow information exchange and sharing of computer resources, and thus enable an organization to take advantage of its total computing capabilities. It is increasingly common for computer resources to be arranged into local area networks (LANs), especially when data transfer is required among several resources, or stations, located at various places within a building or cluster of buildings.

Because organizations often either use computer equipment made by a number of different manufacturers, or desire to exchange information with other organizations that use different equipment, it became quite apparent in the late 1970's that a way to support high-speed data communication between different types of computers would be needed.

This prompted the Institute of Electrical and Electronic Engineers (IEEE) to begin its Project 802. The IEEE quickly reached two conclusions. First, because of diversity in design, getting different computers to communicate is a complex problem. It requires architecture decisions not only at low levels, such as agreeing upon suitable modulation schemes, but also at higher levels. Second, no single architecture is ideal for all applications.

The IEEE thus developed a LAN reference model having three "layers". A first layer, called the physical layer, is concerned with the nature of the transmission medium. A second layer, called the media access control (MAC) layer, is concerned with the details cf signalling along the physical layer. Messages are exchanged, among many stations, in groups of elemental symbols. The basic message is called a frame at the MAC layer, with allowable frame types include both control frames and data frames. Data frames contain the information which is to be exchanged over the broadcast network, while control frames are used to issue instructions to each station, primarily to insure that no two stations attempt to transmit at the same time. A third layer, the logical link control (LLC) layer, is concerned with establishing, maintaining, and terminating logical links between stations.

The IEEE also concluded that no single MAC-layer architecture would be ideal for all situations. Performance can be sacrificed for lower cost in some applications, such as the typical office, but in other environments, such as the typical factory, users will spend more money to obtain a network which is more robust. The IEEE 802.4 Token-Passing Bus Access Method was developed for these critical environments.

Even though the 802.4 standard specifies a fairly robust communication environment, failures still occur due to equipment malfunction, network mis-operation, or programming errors. There is a need to identify which station is the source of such failures, particularly since a single malfunctioning station may prevent use of the network by other stations. The failure source often needs to be located quickly, especially when the profitability of the organization is critically dependent upon the operation of the LAN, such as is often the case in a manufacturing environment.

The failure identification problem is further exacerbated by the presence of equipment manufactured by multiple, independent companies. Although all such LAN equipment operates in accordance with a standard protocol, it is often difficult to consistently obtain diagnostic information about each station in such a situation. This can be especially true if several vendors have chosen to implement the standard protocol in different ways, or require conflicting diagnostic procedures.

It is also necessary to understand the utilization of the LAN in order to locate and correct performance bottlenecks. Such bottlenecks often occur due to load imbalances, and especially those caused by heavy traffic to and from certain stations, called bridges. Bridges serve as gateways for messages from one network to another, and thus are often a bottleneck. As a result, network managers often seek answers to questions such as (1) To what degree does each station utilize the medium? (2) Should the network be broken into multiple, interconnected networks for load balancing? and (3) How much of the traffic is being routed through bridges?

Certain diagnostic tools, called monitors, are presently available to help identify and isolate network failures as well as performance bottlenecks. Monitors are generally of two types, with each type having distinct disadvantages.

With the first type of monitor, diagnostic and performance information is collected in some form by each station. This information is then transmitted to a central location and combined with information from other stations.

There are several drawbacks to this approach. First, the information is physically difficult to collect from each station. If the LAN itself is used to transmit the information, certain types of LAN failures will also prevent collection of diagnostic data, and thus prevent proper diagnosis of the trouble. On the other hand, if a secondary path is used to collect information, expensive and cumbersome hardware must be added. Finally, the types of data which each station can collect may often be limited by performance constraints. In the absence of a previously standardized or agreed-upon set of parameters to be maintained, the management information collected from equipment manufactured by different suppliers may not be compatible, and in the worst case, may even lead to conflicting conclusions about equipment malfunctions.

In fact, this is presently such a problem that several industry organizations are proposing management standards, which will specify which information must be maintained by each station, as well as how the information should be exchanged.

A second type of monitor attaches directly to the LAN and detects and stores data packet traces, much in the same manner as a logic analyzer. These monitors are sometimes capable of recording the number and type of frames transmitted by each station. However, they also have several disadvantages.

First, since these monitors do not automatically determine which station is the source of errors, they require an operator who is knowledgeable about the network protocol, at least enough to recognize that certain frame types should not occur in certain situations. The operator must typically program the monitor with a data sequence to be triggered on, and then must manually review the traces occurring after the trigger to determine the source of a problem. Thus, these monitors do not report problems in real-time, generally require programming to detect errors, and do not give automatic indication of the source of a problem.

Second, these monitors cannot automatically identify which frames are transmitted by stations that accesses the network through a bridge. This is because the source addresses of such frames are not that of the bridge itself, but rather that of an originating station located on the other side of the bridge. The bridge merely forwards these frames to the local area network, without modifying address fields in the frame.

Thus, there is an unmet need for a data communications network monitoring device which reliably and quickly identifies faults, without requiring a high level of operator expertise. The monitor should not require the use of station resources, and should not use the network itself to transmit diagnostic information. The monitor should avoid the need for requiring stations to observe agreed-upon management protocols. It should also measure network utilization not only by the directly attached stations, but also by stations connected to the network through bridges.

SUMMARY OF THE INVENTION

Briefly, a network monitor constructed in accordance with the invention diagnoses whether one or more stations in a broadcast communications network are malfunctioning. This is accomplished by passively detecting sequences of control frame transmissions. Detected control frame sequences are compared, in real time, to a model of the expected exchange of control frames. The monitor concludes that a malfunction has occurred when the detected control frame sequences do not match the frame sequences indicated by model. Observed malfunction are then reported.

The monitor is quite useful with a network that uses a token passing protocol. In this configuration, it can determine whether a particular station is working improperly by detecting sequences of token-passing control frames, and then track whether the token is passed in the order proscribed by the model.

The monitor can also infer that a cable is broken, a station has dropped from the network, a particular station's receiver or transmitter is operating marginally or has failed, a slot time value is incorrectly set, or that other types of malfunctions have occurred, and when appropriate, localizes these to a particular station.

Because the monitor collects information concerning the sequence of control frames, it also can report other information concerning the network. For example, it observes and maintains statistics on network data traffic and configuration information, in real time. Traffic monitoring is accomplished by examining the source or destination address field of detected data frame's, and counting the various types of data frames for each source and destination station.

Since the monitor independently tracks which station has the token, statistics are easily developed on how much traffic is passing to and from bridges, as well as to and from each station located behind a bridge. In this fashion, a bridge that has become overloaded can be readily identified.

Because the monitor is passive, it does not require the network to be completely operational in order to report malfunctions, the use of station resources, or a previously agreed-upon management protocol.

Unlike prior approaches which counted types of frames, or triggered upon detection of a single instance of a frame sequence, the monitor continuously tracks all network traffic, and reports appropriate messages in real time. The monitor thus has the distinct advantage of being readily usable by an operator having little or no personal expertise in the operation of the network protocol, since its output does not solely consist of traces. Rather, the monitor reports events which do not match the expected network behavior, without the need for intervention of an experienced network operator to program it.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
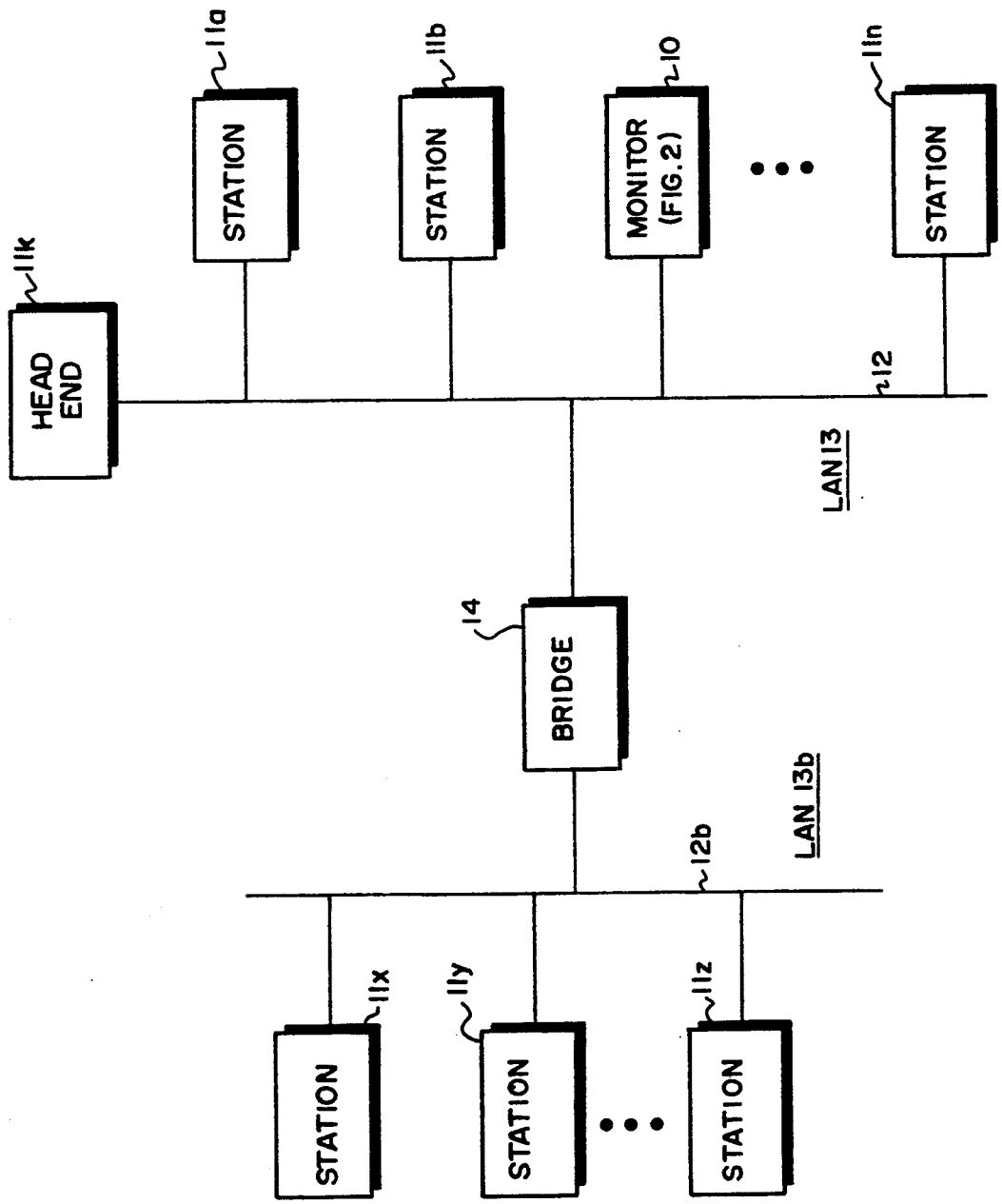
FIG. 1 is a block diagram of a broadband data communications network that makes use of a passive monitor in accordance with the invention.

Turning to the drawings more particularly, there is shown in FIG. 1 a passive monitor 10 constructed in accordance with the invention Passive monitor 10 detects sequences of control frames passed between a number of stations 11a, 11b, . . . and 11n (collectively, stations 11) over a broadcast media 12. The passive monitor 10, stations 11, and broadcast media 12 form a data communication network, and in the particular embodiment shown, a local area network (LAN) 13.

The stations 11 connected to LAN 13 use a Media Access Control (MAC) protocol to determine which station has the right to transmit. The specific protocol used in the preferred embodiment is defined by IEEE Standard 802.4, a token-passing bus protocol. Details of the 802.4 Standard are available in *Token Passing Bus Access Method in Physical Layer Specifications, ANSI/IEEE Std* 802.4-1985 (New York: Institute of Electrical and Electronic Engineers, 1985), which is incorporated herein by reference. However, the invention can be adapted to operate with other MAC protocols, and for that matter, with any layered protocol that uses control frames.

In accordance with the 802.4 Standard, a token is a special control frame which represents the right to transmit. Under ordinary operating conditions, a station 11 receiving a token is thus given the right to transmit. Only the station having the token may transmit at any given instant in time. When a particular station II has finished transmission, it passes the token to another station in accordance with the 802.4 protocol. The token passes among stations 11 in a prescribed sequences—thus the stations 11 are said to be arranged in a "ring", and the token is said to move around the ring.

Also, in accordance with the 802.4 Standard, a head-end remodulator 11k is connected to the LAN 13 when the broadcast media 12 is broadband. The head-end remodulator 11k acts as a radio-frequency repeater.

The LAN 13 may also include a bridge 14. The bridge 14 is a device which enables stations connected to the LAN 13 to also communicate with devices connected to other networks, such as the LAN 13b formed by stations 11x, 11y, . . . 11z and another broadcast media 12b.

In operation, briefly, the passive monitor 10 listens to transmitted control and data frame traffic on the LAN 13. Monitor 10 is truly passive in that it does not initiate communications over the LAN 13, but merely receives and interprets control and data frame traffic. Passive monitor 10 detects sequences of control frames exchanged between stations 11. That is, rather that simply watch control and data frame traffic to or from a specific station 11, passive monitor 10 tracks traffic to and from each station 11 connected to the LAN 13. It thus develops a current state for the entire network. For example, among other things, passive monitor 10 keeps track of which station 11 last received a valid token-passing frame, and thus which station 11 currently has a valid right to transmit.

Passive monitor 10 also has stored a model of the expected behavior of frame traffic on the LAN 13, and in particular, a model of the MAC-layer protocol specified by 802.4. Passive monitor 10 can thus make inferences concerning whether the network is operating properly. For example, the passive monitor 10 can accurately determine which station should have the right to transmit, by traversing the model of expected frame traffic, and comparing the model with what is actually observed.

There are several advantages to this approach. Since the stations 11 themselves need not maintain any particular data concerning the operation of LAN 13, a protocol for exchange of management information is not needed. Each station 11 need only conform to the basic network communication protocol used for the LAN 13. Furthermore, the network being monitored need not be completely functional for successful operation of monitor 10. In addition, the monitor 10 not only diagnoses whether a station has malfunctioned, but also compiles complete message traffic statistics, without using network resources.

Figure 2:
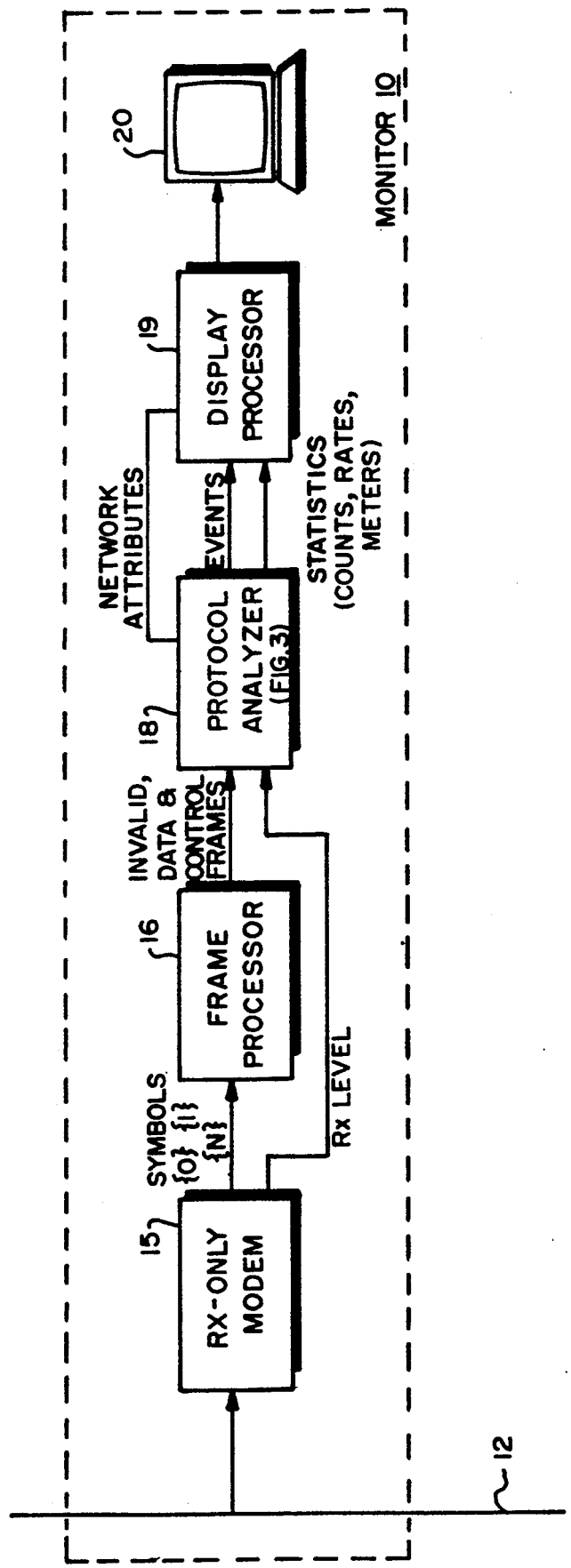
FIG. 2 is a detailed block diagram of the passive monitor.

To appreciate how this is accomplished, consider the detailed block diagram of passive monitor 10 in FIG. 2. Passive monitor 10 includes a receive-only modem 15, a frame processor 16, a protocol analyzer 18, a operator interface 19, and a display 20.

The modem 15 is similar to modems found in the receivers of stations 11 connected to the LAN 13. Operating in accordance with the 802.4 Standard, modem 15 outputs a series of demodulated symbols. The possible symbol types are {0} and {1}, as in conventional binary data signalling, and a non-data symbol {n}, used in the 802.4 Standard to delineate the fields defined for both data and control frames. Modem 15 also outputs an indication of the strength of the radio frequency signal receive-level on the media 12.

The frame processor 16 is similar to those found in the receivers of stations 11 connected to the LAN 13. Frame processor 16 converts the series of symbols from the modem 15 into frames, in accordance with the 802.4 protocol. The frame processor 16 thus performs the functions of the MAC layer, and outputs data and control frames to the protocol analyzer 18.

Frame processor 16 detects erroneous symbol sequences, frame control fields, frame checksums and the like, also in accordance with 802.4, to determine if each received frame is valid. The output of frame processor 16 thus includes information concerning invalid frames as well as valid data and valid control frames. Frame processor 16 also recognizes certain symbol sequences such as silence.

Protocol analyzer 18 is preferably implemented as a computer containing appropriate software to interpret the output of the frame processor 16. Given the data rates possible over a LAN 13 using the 802.4 protocol, the computer is preferably a high-speed processor constructed from a bit-slice or reduced-instruction set computer (RISC) technology. The operation of the protocol analyzer 18 on the frame information output by frame processor 16 is at the heart of this invention.

Protocol analyzer 18 collects several types of information, including statistics, events, and network attributes. Generally speaking, statistics are taken on any phenomena of note, such as a noise burst, a repeated frame, receipt of a non-valid frame, a token-pass, a station leaving or entering the ring, a contention for the token, and the like. Statistics are kept for each station presently in the ring. The occurrence of these phenomena are preferably recorded by incrementing a counter, and thus are referred to as "counts". Counts are also quantities regarding that traffic load on the LAN 13, such as the number of frames originated by each station 11, or the number of bytes of data sent by each.

Other types of statistics include "rates", which are simply the average value of a counts per unit time, and "meters", which are phenomena that have units such as time or power. Thus, the observed token-rotation-time and receive-level are meters.

An event is an occurrence of interest, such as an unexpected frame sequence, or the observation that one of the stations 11 has improperly dropped from the ring.

A more complete understanding of the statistics and events of interest is evident after reading the later discussion of FIGS. 5A through 5D.

Protocol analyzer 18 maintains counts and events separately for all stations 11 on the LAN 13, including devices such as bridge 14.

Network attributes are information regarding the present configuration of the LAN 13, including the number of stations 11 currently in the ring, the logical ordering of stations in the ring, which station previously had and presently has the token, the expected token-passing sequence, and the like.

The output of protocol analyzer 18 is processed by the display processor 19, for presentation to the display 20. The display processor 19 and display 20 may simply present the number of counts, or log the occurrence of an event, but can also generate alarms messages when a count exceeds a predetermined threshold amount or upon certain events, or present graphical display of information. Display processor 19 and display 20 are preferably embodied as a general purpose computer.

Figure 3:
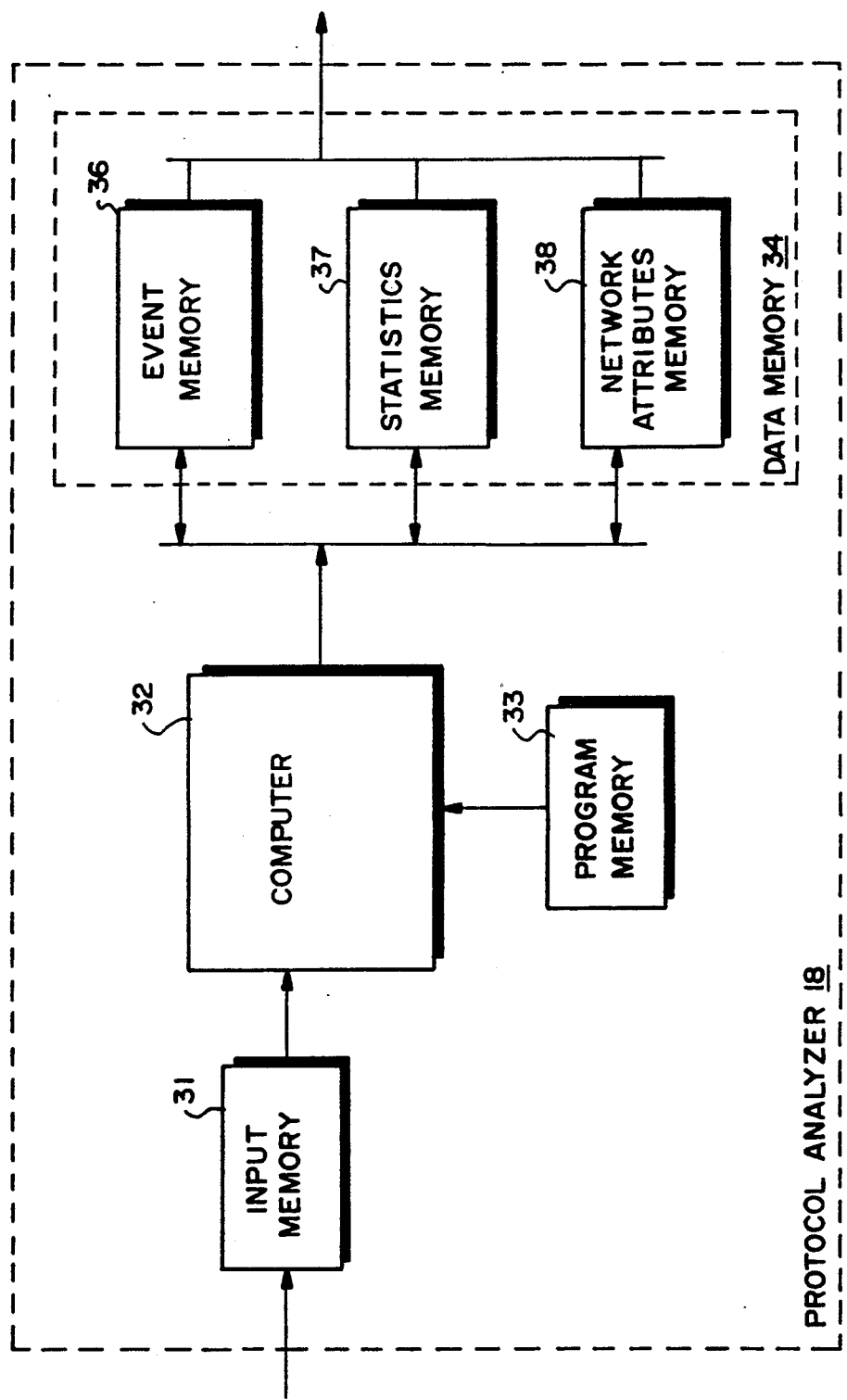
FIG. 3 is a detailed block diagram of a protocol analyzer portion of the passive monitor.

FIG. 3 is a detailed block diagram of the protocol analyzer 18, which includes an input memory 31, a computer 32, a program memory 33, and a data memory 34. The data memory 34 is further logically divided into separate blocks of data, grouped as a event memory 36, a statistics memory 37 and a network attributes memory 38.

The input memory 31 receives frames, whether valid or invalid, from the frame processor 16. The input memory 31 is typically a first in first out (FIFO) memory, and is to normalize the frame input rate to computer 32.

The computer 32 operates as an inference-processor, to analyze the sequence of data, control, and invalid frames received from the input memory 31. As previously mentioned, the computer 32 analyzes frames by comparing frame sequences with an internal model of the expected frame sequences to detect protocol violations, and hence station malfunctions. The protocol model is not just of the expected behavior of one station, but a model of the expected behavior of the entire network. The model thus contains information concerning the expected exchange of frame sequence for the entire network.

The internal model of the protocol is preferably stored in the sequence of instructions stored in the program memory 33. Alternatively, computer 32 and program memory 33 can be organized as an expert system, using an inference engine and knowledge base, with the knowledge base containing a set of if-then-production rules that represent the network protocol, and the inference engine suited for traversing the knowledge base to indicated conclusions based upon what traffic has actually been observed on the LAN 13.

Regardless of the implementation details of protocol analyzer 18, the result of the operation of computer 32 is to store events, statistics, and attributes data, in the respective one of the event memory 36, statistics memory 37, or attributes memory 38. .The event memory 36, statistics memory 37, and attributes memory 38 are preferable dual-port random access memories (RAMs), so that both the computer 32 and the operator interface 19 (FIG. 1) may access them simultaneously.

Figure 4A:
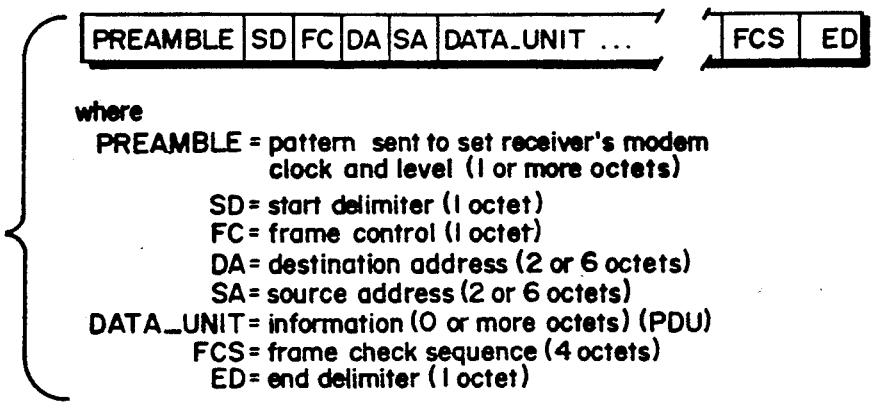
FIGS. 4A through 4C show control frame formats specified by the IEEE 802.4 token-passing bus protocol.
Figure 4B:
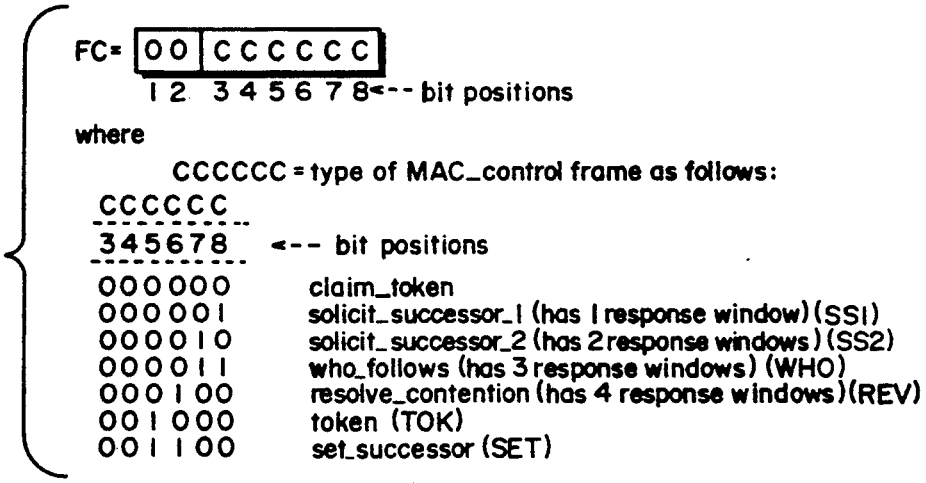
Figure 4C:
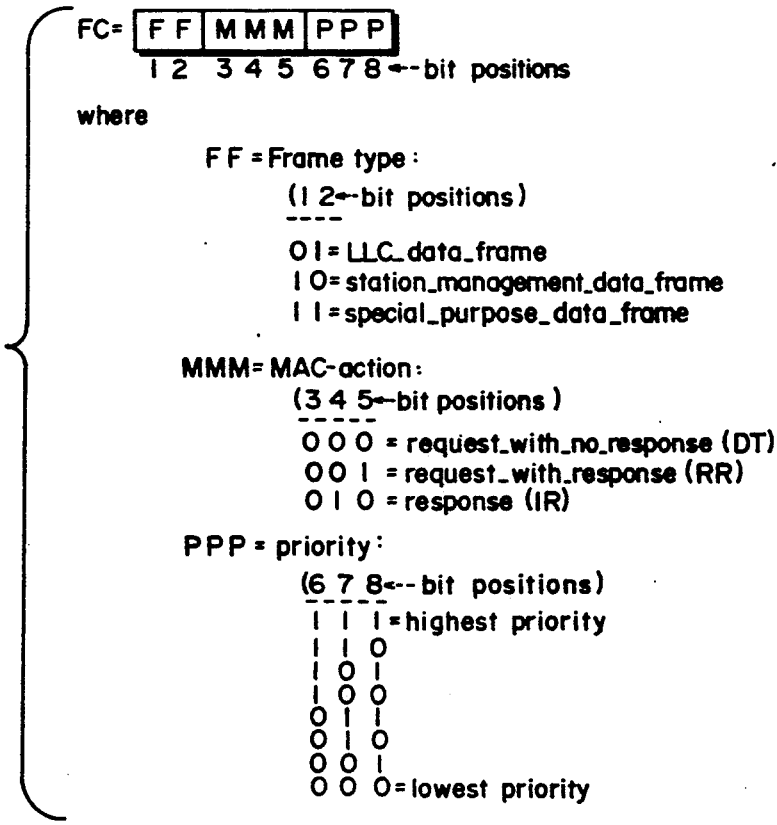

To better understand the sequence of operations performed by computer 32, it is important to first understand the various frame formats defined by the 802.4 Standard, as shown in FIGS. 4A through 4C. All valid frames include a number of sub-fields, with each sub-field being one or more octets (i.e., groups of eight symbols). As shown in FIG. 4A, the sub-fields include, in order, a PREAMBLE field, used to synchronize receiver modems, an SD field used as a start delimiter, an FC field used as a frame control field, DA and SA fields used as destination address and source address fields, respectfully, a DATA_UNIT field of zero or more octets used as a data transfer mechanism, an FCS field used as a frame check sequence, and an ED field used as an end delimiter.

The protocol analyzer 18 is particularly concerned with analyzing the FC field of each frame. The possible FC fields in accordance with the 802.4 protocol are shown in FIGS. 4B and 4C, with the control frame FC fields indicated in FIG. 4B, and the data frame FC fields shown in FIG. 4C.

The 802.4 Standard defines control frames including a claim$_{13}$ token (CLM), solicit$_{13}$ successor_1 (SS1), solicit_successor_2 (SS2), who_follows (WHO), resolve_contention (RSV), token (TOK), and set_ successor (SET) frames. The purpose of each of these frames is set forth in the Standard, especially in Section 5.1 Basic Operation.

Since the Standard has been incorporated by reference, and which will not be repeated here at length. Briefly, however, the token frame represents the right to transmit. It is normally passed from station to station, in descending numerical order of station address. When a station hears a token addressed to itself, it assumes that it now has the right to transmit. When a station completes transmission, it sends a token frame to the next lowest address station in the ring. If the sending station does not hear traffic after attempting to pass the token to its successor twice, it uses who_follows to determine the address of the next station in the ring. Any responding station uses the set_successor frame to tell the original station who the new successor station is.

Solicit_successor_1 frames are periodically sent by each station, after finishing transmission, to determine if any new stations wish to be added to the ring between the present station and its successor station.

If no response is heard to a who_follows, a solicit_ successor_2 frame is sent, which asks any station to respond.

Resolve_contention frames are used to settle the situation where more than one station attempts to respond to a who_follows, solicit_successor_1, or solicit_successor_2.

FIG. 4C shows the FC fields for various data frames. Of interest here are the request_with_no_response (DT) (or normal data), request_with_response (RR), and response (IR) frames formats.

As previously described, the passive monitor 10 detects and isolates operational faults to a failing station by passively observing the control frame transmissions on the bus, comparing the operation of the protocol on the bus with that expected, and inferring that a fault has occurred and which station is causing the fault. Detailed flow charts of how this is accomplished are shown in FIGS. 5A through 5D. By way of summary, protocol analyzer 18 concludes several things based upon its observation of frame sequences. For example, if the last thing detected by frame processor 16 was (A) no frame (refer to FIG. 5A for more detail),
   the broadcast media cable 12 is broken or the head-end has failed if periodic silence is not heard;
   a cable or head end failure may have occurred if no frames are heard; or
(B) a non-valid frame (refer to FIG. 5B for detail),
   a station's transmitter is failing, if it sends invalid frames as indicated by the modem 15;
   a station's transmitter is failing or transmitting at an incorrect power level, or the cable system path to the station is failing or incorrectly attenuated, if the received signal level measured is outside a predetermined range; or
   collisions may be ocurring if invalid frames are detected and contention for control of the right to transmit is possible;
(C) a data frame (refer to FIG. 5B for detail),
   a station' receiver is failing if it does not correctly responded to response requests, such as when RR frames immediately follow another RR frame; or
   a station is failing if an IR frame is not preceded by an RR frame;
(D) a non-token control frame (refer to FIG. 5C for detail),
   a station may be failing if it sends SET frames not following a WHO frame, indicating frequent network re-entry;
   a station may be failing if its address is in the DATA$_{13}$ UNIT field of a WHO frame issued by the current token-holder;

a station may be failing if it is sending WHO frames with an SA field equal to the current token-holder's successor in the ring a station is failing if it is sending an SSI frame with an SA field greater han its DA field;

a station is failing if it is sending an SS2 frame with an SA field less than or equal to its DA field; or or (E) a token-control frame (refer to FIG. 5D for detail), a station may have failed if it improperly drops from the ring membership, which is determined by comparing the expected token pass sequence with the observed token-pass sequence;

a station's slot time value is incorrectly set, if the measured silence period after between an SSI or SS2 frame and the next TOK frame is outside the correct range;

a station's receiver is failing, if token passes to it from its predecessor are repeated; or the network is either congested or there is at least one failing station, if the time taken to pass the token around the ring exceeds an appropriate pre-defined value.

Turning now to FIGS. 5A through 5D more particularly, the operation of the protocol analyzer 18 to determine if one or more of the above-listed events have occurred will now be understood.

Figure 5A:
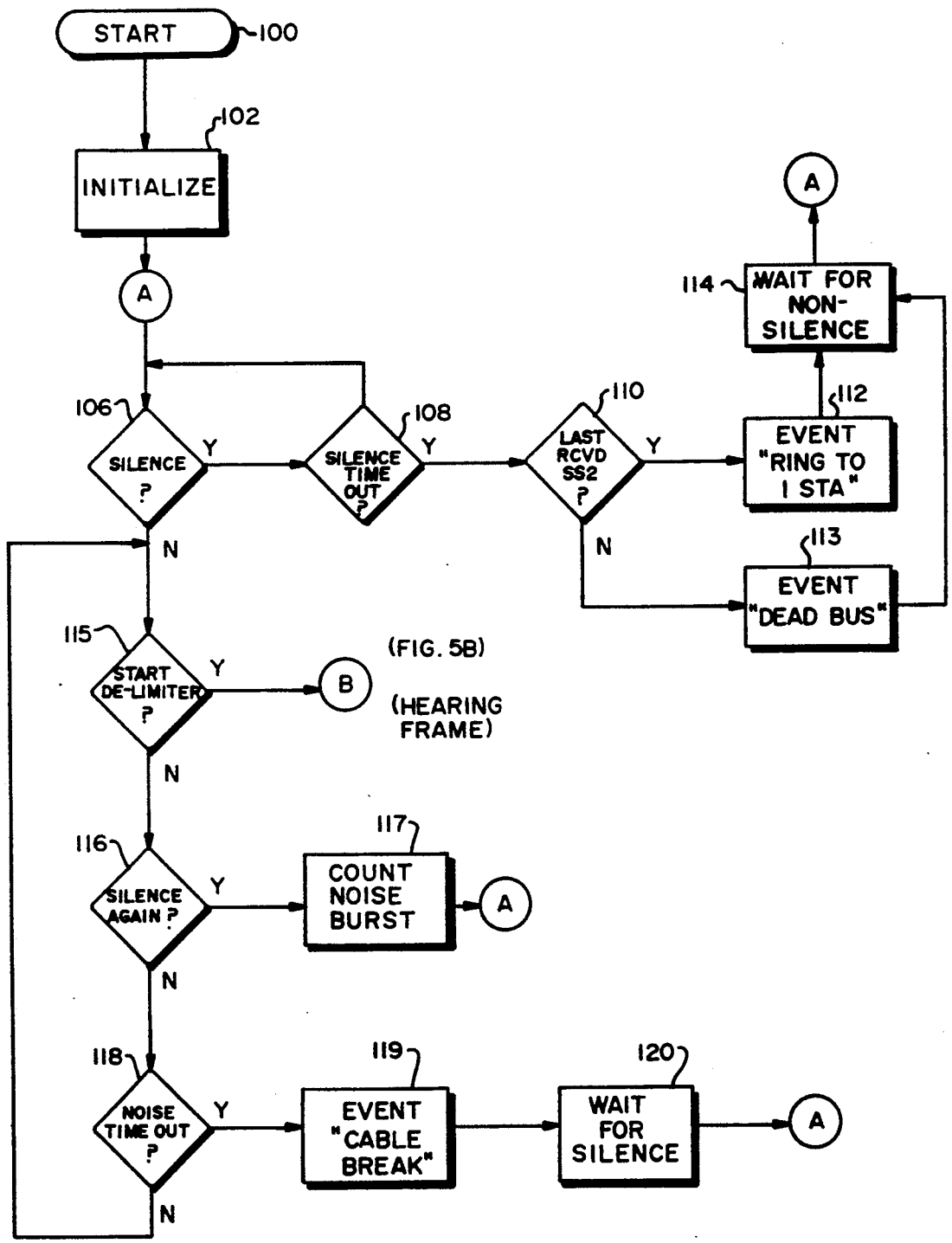
FIGS. 5A through 5D are flow charts of the process used by the passive monitor to characterize the network.

In FIG. 5A, after a start step 100, an initialize step 102 resets appropriate internal variables, such as the contents of the network attributes memory 38, including a record of the current token-holder, records describing the current state of the ring such as the expected successor for each station, and the like. The next step, 104, is used as an entry state A from other steps in the program, whenever a new frame is expected.

The next step 106 is to determine if the frame processor 16 is presently hearing silence. If silence is detected, control passes to step 108 which loops back to step 106 unless silence has been received for longer than the predetermined amount of time (i.e., there is a silence time-out). If a silence time-out has occurred, control passes to step 110 where it is determined whether the last frame received was an SS2. If the answer is yes, it can be assumed that the network validly entered a state where only one station is active, and that is reported as an event, in step 112. However, if SS2 was not the last received frame in step 110, a dead bus event is reported, in step 113. In either event, control passes to step 144 which waits for the next non-silence indication from the modem 15, and then returns to A (step 104).

If something other than silence is heard in step 106, it is assumed that a frame sequence has begun, and control passes to step 115 where a start delimiter is looked for. Upon receipt of a start delimiter, a frame is being received and control passes to B (step 150) in FIG. 4B.

However, if silence is then heard again, a noise burst must have occurred. This is counted in step 117, and then control passes back to A.

Otherwise, if silence is not heard again in step 117, control passes to step 118. The noise burst must be continuing, and step 118 determines if a predetermined noise burst time-out period has expired. If not, control returns to step 115. If the time-out period has expired, a cable break event, that is, an indication that there may be a disruption of the media 12, is reported in step 119, and silence is again waited for in step 120 before returning to A.

Figure 5B:
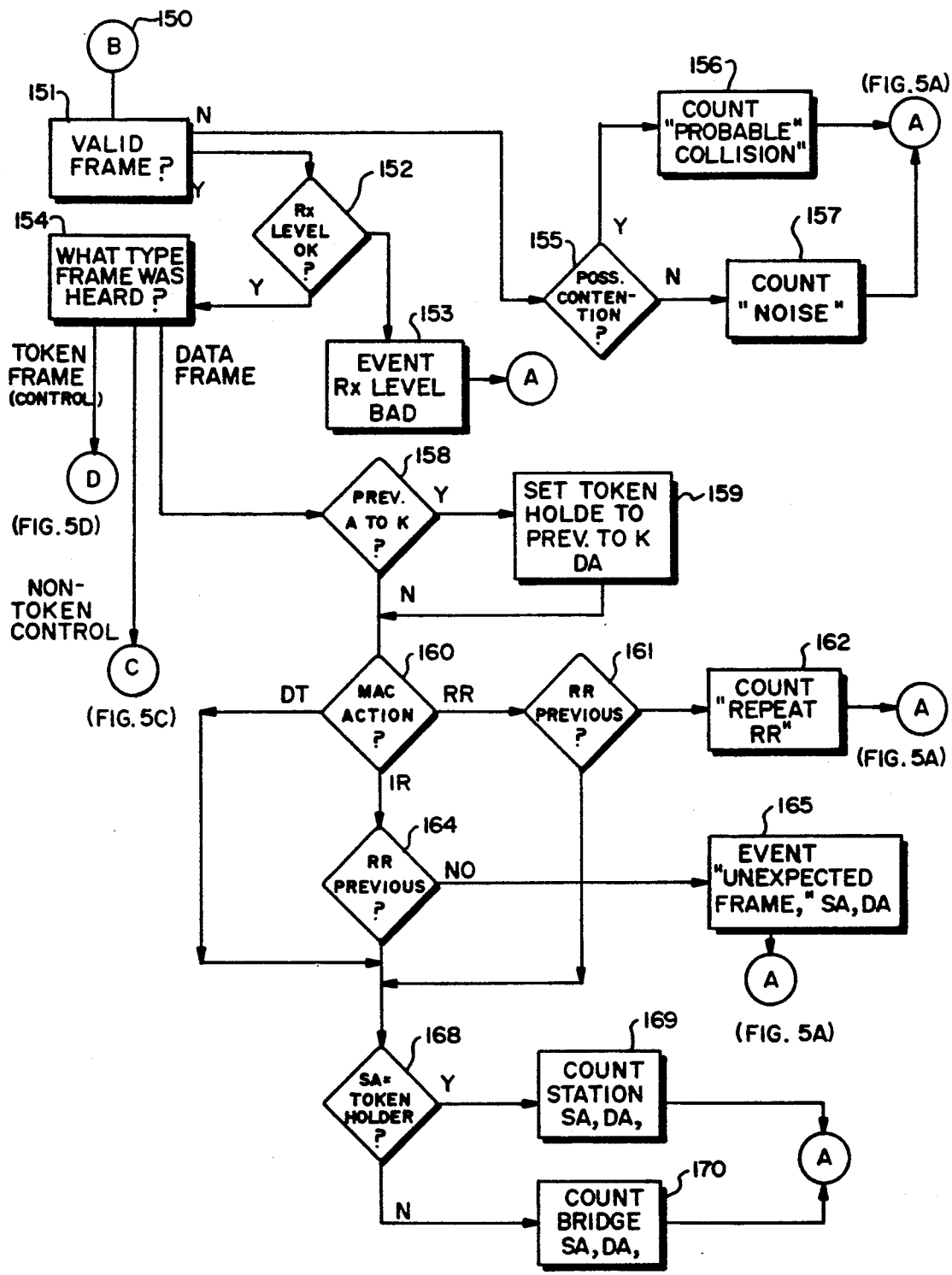

The initial steps executed upon indication of receipt of a frame are shown in FIG. 5B. From B, control passes to step 151, where it is determined if the frame was valid. If an invalid frame was received, control passes to step 155.

In step 155, it is first determined if the non-valid frame was possibly caused by contention for control of the LAN 13, i.e., two or more stations have collided by trying to transmit at the same time. Contention is possible if the last frame received was an SSI, SS2, WHO, CLM, or RSV. Contention is not possible if any other frame type was most recently received. (SET frames are ignored in this determination). If this is true, a probable collision is counted in step 156. If this is not true, a noise count is made in step 157. Step 157 may keep separate noise counters for different types of invalid frames. Control returns to A from either step 156 or 157.

If the frame was a valid frame in step 151, control passes to step 152, where the receive-level is checked. If this is outside pre-defined limits, a receive-level outside limits event is reported in step 153, and control returns to A.

In step 154 a determination is made of what type of valid frame was heard. If it was a data frame control passes to step 158; if a non-token control frame, to C (step 200 in FIG. 5C); and if a token frame, to D (step 250 in FIG. D).

Upon receipt of a valid data frame, control passes to step 158. The next test is to determine if the previous frame was a token. If so, the current token-holder is set to the previous token frame's destination address in step 159. Thus, the protocol analyzer 18 does not assume that a token pass has taken place until it actually observes a data frame issued by the destination station indicated by the last token.

Thus, unlike other possible monitor schemes, the analyzer 18 does not require the SA cf the data frame to be that of the token-holder. This allows proper recording of traffic statistics from bridges.

Control then passes to step 160 where the MAC action portion of the FC field is examined to determine the type of data frame. If it is a DT, or normal data frame, control passes to step 168. However, if it is a response (IR) or request_with_response (RR) frame, control passes to steps 164 or 161, respectively.

In step 161, if an RR frame was last heard, step 162 counts a repeat RR. This may indicate that the receiver of the RR frame is failing. If this is not the case, control passes to step 168.

In step 164, if an IR is not preceded by an RR frame, step 165 reports an unexpected frame for the stations indicated by the source address (SA) and destination address (DA) fields of the current frame, along with the detected unexpected frame type.

From either step 162 or 165 control returns to A.

In step 168, the SA field of the current frame is compared to the current token-holder address. If these are equal, the frame originated from a station on the LAN 13, and station-type counts are taken in step 169. However, if these are not equal, is it concluded in step 170 that the frame originated from a bridge connected to the LAN 13, and thus the SA is actually the address cf a station whose frames are being forwarded by the bridge 14.

Thus, unlike prior monitors, the token-holder is recorded in such a way that the possible existence of a bridge 14 is accounted for. By keeping track of the token-holder in the manner described herein, the protocol analyzer 18 can conclude that all frame transmitted after a token-pass to the bridge 14 are from stations 11 connected to the bridge, until the protocol analyzer 18 sees another token-pass, by the bridge. This allows protocol analyzer 18 to keep bridge traffic statistics and other bridge management data.

Figure 5C:
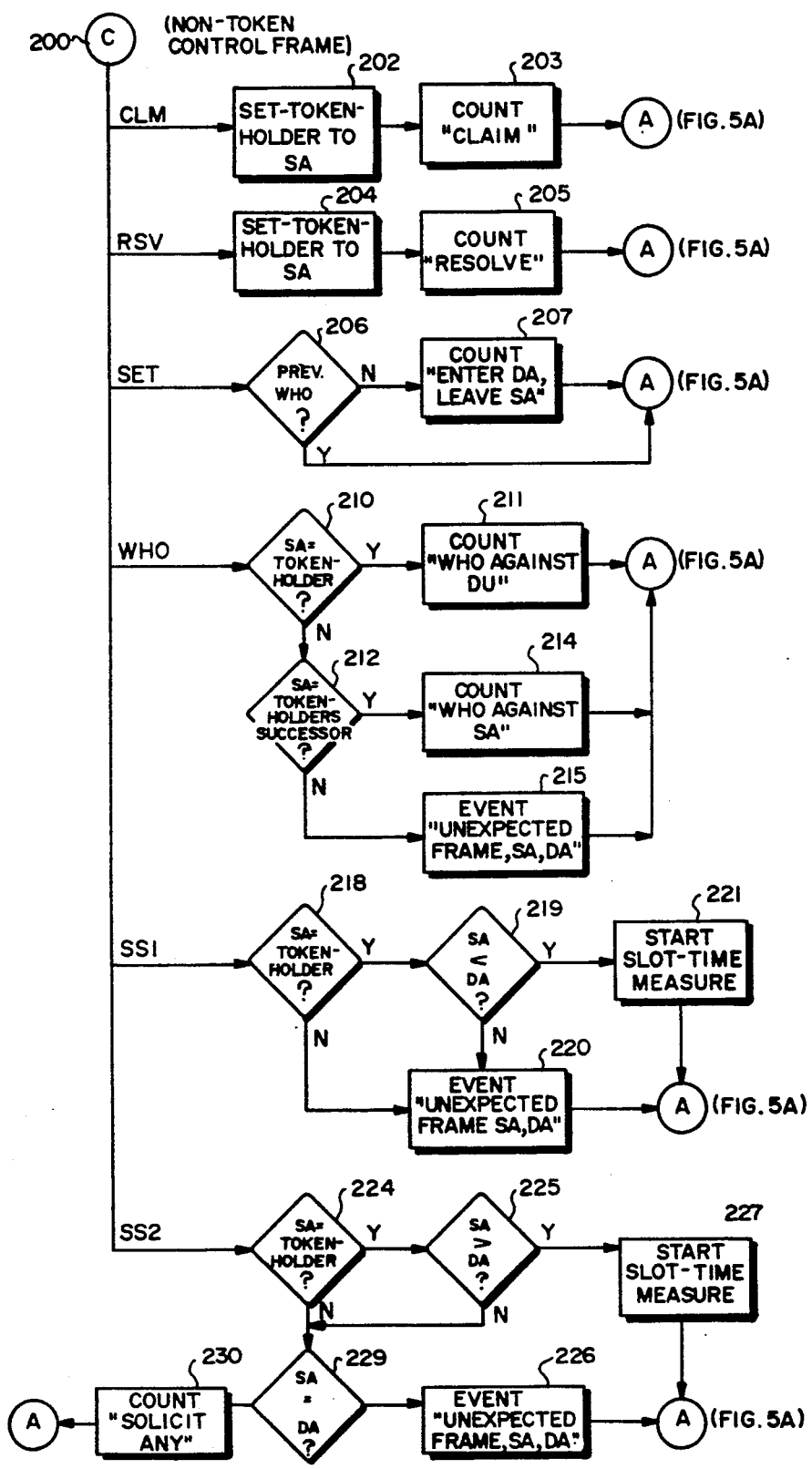

In FIG. 5C, the process for handling a non-token control frame is shown. From C, step 200, if the non-token control frame is a CLM, RSV, SET, WHO, SSI, or SS2, control passes to steps 202, 204, 206, 210, 218, or 224, respectively.

For a CLM frame, in step 202 the token-holder is set equal to the SA field, a claim is counted in step 203, and control returns to A.

For an RSV Frame, in step 204 the token-holder is set equal to the SA field, a resolve is counted in step 205, and control returns to A.

For a SET Frame, in step 206, it is first determined if a WHO frame was previously received. If so, nothing is wrong with the transmitting station, and control passes to A. If not, however, there appears to be an instance of the ring changing its configuration, and in step 207, a count is recorded. The count occurs whenever a station enters the ring or voluntarily leaves it. If an SSI or SS2 has followed the previous TOK, the station is entering, otherwise, it is leaving.

Step 210 is the first step which handles WHO frames. The idea here is to determine if it is the token-holder's transmitter or the successor's receiver which is failing. If the SA field of the WHO frame equals the token-holder, then in step 211 it is concluded that the station indicated by the DATA_UNIT (DU) field must be failing, since the token-holder is asking which station follows it.

A typical sequence of frames to arrive at step 211 is as follows, such as when the station to which the token should be passed has a failing receiver:

| | |
|---|---|
| TOK A B | (B's receiver bad) |
| nothing | |
| TOK A B | |
| nothing | |
| WHO A X B | (X is any station) |
| | (first parameter is SA, |
| SET C A C | second parameter is DA, |
| TOK A C | third is DU, for WHO and SET) |

In this scenario, station A tries to pass the token to station B, and B's receiver is failing or has failed entirely. After hearing no acknowledgement for the predetermined time-out period, A tries again. Upon the second failure, A originates a WHO B, asking any station to respond. Station C responds, and then A passes the token to C. Thus in this scenario, the SA of the WHO frame is the same as the current token-holder.

However, if the SA field in the WHO frame equals the token-holder's expected successor station, as indicated by the present model of the expected token-passing sequence kept in the configuration memory 38, the WHO is counted against the station indicated by the SA, which must have a failing transmitter.

As an example of how this might occur, when A has the token, but its transmitter is bad, consider the control frame sequence:

| | |
|---|---|
| TOK C A | (A's transmitter bad) |

| -continued | |
|---|---|
| data frames | |
| ... | |
| TOK A B ** | |
| nothing | |
| TOK A B ** | (monitor still thinks C |
| nothing | is token-holder) |
| WHO A X B | |

(** These TOK frames are interpreted as invalid since A's Tx is bad

Since station A's transmitter is bad, the attempted token pass from A to B are never recognized by B or the monitor. The monitor thus thinks that C is still the token-holder. The monitor does know that A is C's successor, however, and thus charges the error to A, concluding that A's transmitter must be malfunctioning.

In step 218, if the SA of the WHO frame does not equal the token-holder's successor address, the monitor has lost track of the current network state, and reports an unexpected frame.

Upon receipt of an SSI frame, it is determined in step 218 if the SA field equals the token-holder. If so, and SA is less than DA, in step 221 it is known that a slot-time delay will be observed, and so a timer is started. However, if the answer in step 218 is no, an unexpected frame event is reported, since SSI frames should only be sent by stations having SA less than DA, i.e., stations not at the end of the ring.

The process, from step 224, for SS2 frames is similar. However, in step 225, the SA field is expected to be greater than the DA field. If SA is not greater, or equal to the token-holder, the frame is checked to see if it is a solicit-any, in step 229. If so, this is counted in step 230. This occurrence normally indicates that a sole station on the LAN 13 is attempting to solicit communications.

Control returns to A from each of the non-token frame commands sequences in FIG. 5C.

Figure 5D:
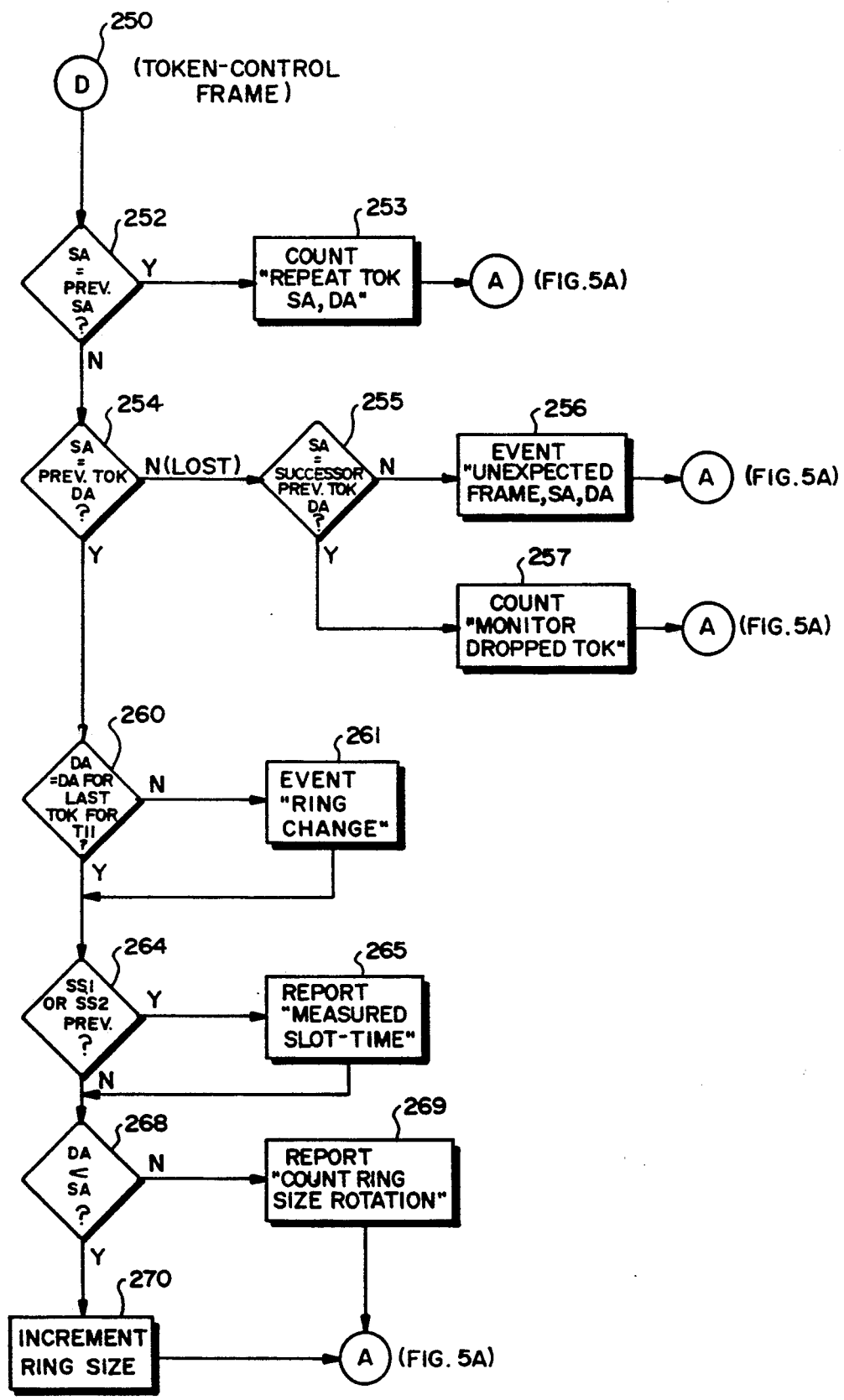

FIG. 5D contains the sequence of steps executed for a token frame. From D, step 250, step 252 determines if SA equals the previous token frame SA. If so, the step 252 counts a repeat token, and control returns to A.

If not, step 254 determines if SA equals the previous token's DA field. If so, this is expected. If not, the monitor has either lost track of the network's token-pass state or is initializing. Step 255 determines if the SA address equals the successor to the previous token frame's DA field. If this is false, there is an unexpected frame event. This would happen, for example, if the monitor missed one token pass. However, if the answer in step 355 is yes, the monitor is truly lost, and counts, in step 257, that it must have missed at least one token pass. Control returns to A in either event.

Step 260 is executed if the token frame was in an expected sequence. Here, the DA field of the present token is checked against the expected token-passing sequence in the stored ring configuration to determine the expected successor. If these are not equal, then a station has either left or been added to the ring, and a ring change event is reported in step 261. This is also the appropriate place to update the ring configuration in the attributes memory 38.

Next, in step 264, it is determined if an SSI or SS2 was the previous frame. If so, a clock of the previous slot time interval is read in step 265.

In step 268, if the DA is less than the SA, which is the usual case as the token passes from station to station in descending order of address, control passes to step 270, where the ring size counter is incremented. However, if this is not the case, the ring has rotated, i.e., a fly-back of the token from the lowest to the highest address station has occurred, and the token rotation time can be reported in step 269. Control passes to step A in either event.

The foregoing description has been limited to a specific embodiment of this invention. It will be apparent, however, that variations and modifications may be made to the invention, with the attainment of some or all of the advantages of the invention. For example, the invention can be adapted to work with other token bus protocols, other token-passing protocols, and even other protocols which exchange control frames. Therefore, it is the object of the appended claims to cover all such variations and modifications as come within the true spirit and scope of the invention.

What is claimed is:

1. A method for passively monitoring an operating data communications network, the network including a plurality of stations, the stations communicating by exchanging data and control information in accordance with a protocol, the method for monitoring comprising the steps of:
   storing information which represents an expected sequence of control information exchanged between two stations in the network;
   passively detecting sequences of control information actually transmitted over the network, and thus maintaining a current state for the network;
   determining if unexpected control information sequences have occurred, by comparing the detected control information sequences with the stored expected sequence of control information; and
   determining if a particular station is malfunctioning, by examining the unexpected control information sequences.

2. A method for passively monitoring an operating data communications network, the network including a plurality of stations, the stations communicating by exchanging data and control information in accordance with a protocol, the control information including control frames having source and destination address fields, at least one type of control frame including at token-passing control frame used to control which station has the right to transmit at a particular time, the method comprising the steps of:
   storing information which represents an expected exchange of control frames between any two stations in the network;
   passively detecting sequences of control frames actually transmitted over the network;
   comparing the detected control frame sequences with the stored expected exchange of control frames, to determine if unexpected control frame sequences have been transmitted; and
   maintaining a token-holder record which indicates the identity of a present token-holder, the token-holder record updated only after the comparing step determines that an unexpected token-passing control frame sequence has not occurred.

3. A method as in claim 2 wherein the control frames include claim-token and resolve-contention frames, and the step of maintaining the token-holder record further comprises the steps of:
   after detecting a claim-token control frame, setting the token-holder record equal to the source address field in the claim-token frame; and
   after detecting a resolve-contention control frame, setting the token-holder record equal to the source address field in the resolve-contention frame.

4. A method as in claim 2 wherein the step of detecting also detects data frames, and the step of maintaining the token-holder record further comprises the step of:
   after detecting a data frame, if the immediate preceding frame transmitted over the network was a token-passing frame, setting the token-holder record equal to the destination address of the immediate preceding token-passing frame.

5. A method as in claim 2 wherein the control frames include a who-follows control frame having a data-unit field, further comprising the steps of:
   maintaining a record of an expected token-passing sequence, and hence a record of an expected-successor for each value of the token-holder record, the expected successor record updated after each time the token-holder record is updated; and
   wherein the step of determining if a particular station is malfunctioning further comprises the steps of:
   after detecting a who-follows control frame,
      (i) if the token-holder record equals the source address field of the who-follows control frame, determining that the station indicated by the who-follows data-unit field may be malfunctioning; and
      (ii) otherwise, if the source address field of the who-follows control frame equals the expected-successor record associated with the current token-holder record, determining that the station indicated by the source address field of the who-follows control frame may be malfunctioning.

6. A method as in claim 2 wherein the step of determining if a particular station is malfunctioning further comprises:
   comparing the source address field of a token-passing frame to the token-holder record, in order to determine an expected token-passing sequence.

7. A method as in claim 2 wherein the data frames include a request frame and a request-with-response frame, and the step of determining if a particular station is malfunctioning further comprises:
   determining if a response frame is preceded by a request-with-response frame.

8. A method as in claim 2 wherein the data frames include a request-with-response frame, and the step of determining if a particular station is malfunctioning further comprises:
   determining if a request-with-response frame is preceded by a request-with-response frame.

9. A method as in claim 2 further comprising the step of:
   maintaining a record of an expected token-passing sequence, and hence a record of an expected-successor and an expected-predecessor for each value of the token-holder record, the expected successor and expected-predecessor records updated after each time the token-holder record is updated.

10. A method as in claim 9 additionally comprising the step of:
    determining if a ring change envent has occurred, by comparing the destination address field of token-passing frames to the expected-successor record corresponding to the current token-holder record.

11. A method as in claim 9 wherein the step of determining if a particular station is malfunctioning further comprises:

determining if a solicit-successor-first-type control frame is detected having a source address less than its destination address.

12. A method as in claim 9 wherein the step of determining if a particular station is malfunctioning further comprises:

determining if a solicit-successor-second-type control frame is detected having a source address greater than or equal to its destination address.

13. A method as in claim 2 wherein the step of determining if a particular station is malfunctioning further comprises:

determining if token-passing control frames having the same source address are repeated immediately after each other.

14. A method as in claim 2 wherein the step of determining if a particular station is malfunctioning further comprises:

determining an observed slot-time, by measuring the time elapsed between a solicit-successor-first-type control frame or solicit-successor-second-type control frame and the next following token-passing control frame.

15. A method as in claim 2 additionally comprising the step of:

determining an observed token-rotation time, by measuring the time elapsed between occurrences of token-passing control frames having a destination address field less than the source address field.

16. A method as in claim 2, wherein the control frames include a who-follows frame and a set-successor frame, additionally comprising the step of:

determining if a station is frequently re-entering the network, by counting the number of set-successor frames not following a who-follows frame.

17. A method as in claim 2 wherein a malfunction is not reported if the source address field of a data frame does not equal the token-holder, to allow tracking of frames forwarded to the network by a bridge.

18. A monitor for passively observing the operation of a data communications network, the network including a plurality of stations, the stations communicating by exchanging data and control frames in accordance with a protocol, the monitor comprising:

receive modem means for receiving symbols representing signal levels being transmitted on the network;

frame processor means, for interpreting series of symbols, for determining if a series of symbols represents a data frame, a control frame, or an invalid frame in accordance with the protocol, and for outputting actually received frames; and a protocol analyzer, including:

memory means for storing information that represents an expected sequence of control frames between any two stations in the network;

means for determining if an unexpected sequence of control frames has been received, by comparing the actually received frames with the stored expected sequence of control frames; and means for outputting an indication of unexpected control frame sequences as events.

19. Apparatus as in claim 18 wherein the protocol is a token-passing protocol, control frames include a token-passing frame, and control frames have a source address and a destination address, and the protocol analyzer additionally comprises:

means for maintaining a record of the expected token-holder, and the expected-token passing sequence such that there is an expected successor and expected predecessor for each expected token-holder; and means for outputting an indication of an unexpected frame if two token-passing frames immediately follow each other with identical source addresses;

if the source address of a token-passing frame is not equal to the destination address of the last received token-passing frame; or if the destination address of a token-passing frame is different from the expected successor of the current token-holder.

20. Apparatus as in claim 18 wherein control frame types include solicit-successor, who-follows, resolve-contention, and set-successor frames, the means for outputting an indication of an unexpected frame additionally outputs the indication if a request-with-response frame follows a request-with response frame;

if a response frame does not follow a request-with-response frame;

if the source address of a who-follows frame does not equal the expected token-holder; or if the source address of a who-follows frame equals the expected successor of the expected token-holder.

* * * * *